(12) United States Patent
Yashiro

(10) Patent No.: US 7,964,260 B2
(45) Date of Patent: Jun. 21, 2011

(54) OPTICAL RECORDING MEDIUM, RECORDING AND REPRODUCING METHOD THEREOF, AND OPTICAL RECORDING AND REPRODUCING APPARATUS

(75) Inventor: Tohru Yashiro, Ebina (JP)

(73) Assignee: Ricoh Company, Ltd., Tokyo (JP)

( * ) Notice: Subject to any disclaimer, the term of this patent is extended or adjusted under 35 U.S.C. 154(b) by 810 days.

(21) Appl. No.: 11/719,019

(22) PCT Filed: Nov. 7, 2005

(86) PCT No.: PCT/JP2005/020764
§ 371 (c)(1),
(2), (4) Date: May 10, 2007

(87) PCT Pub. No.: WO2006/051922
PCT Pub. Date: May 18, 2006

(65) Prior Publication Data
US 2007/0269628 A1    Nov. 22, 2007

(30) Foreign Application Priority Data
Nov. 10, 2004    (JP) ................................. 2004-326759

(51) Int. Cl.
*B32B 3/02*    (2006.01)
(52) U.S. Cl. ..................... 428/64.1; 428/64.4; 428/64.8; 430/270.14
(58) Field of Classification Search .................. None
See application file for complete search history.

(56) References Cited

U.S. PATENT DOCUMENTS

| 2003/0187272 | A1 | 10/2003 | Shimizu et al. |
| 2005/0042545 | A1* | 2/2005 | Tieke et al. ............... 430/270.11 |
| 2006/0098561 | A1* | 5/2006 | Iwasa et al. ................ 369/275.1 |

FOREIGN PATENT DOCUMENTS

| CN | 1404510 A | 3/2003 |
| CN | 1438639 A | 8/2003 |
| EP | 1 335 357 A1 | 8/2003 |
| EP | 1 768 853 A1 | 4/2007 |
| JP | 9 58123 | 3/1997 |
| JP | 10 188341 | 7/1998 |
| JP | 10 340483 | 12/1998 |
| JP | 11 66622 | 3/1999 |
| JP | 11 134708 | 5/1999 |
| JP | 3074715 | 6/2000 |
| JP | 2000 311384 | 11/2000 |
| JP | 2002 260274 | 9/2002 |

(Continued)

*Primary Examiner* — Elizabeth Mulvaney
(74) *Attorney, Agent, or Firm* — Oblon, Spivak, McClelland, Maier & Neustadt, L.L.P.

(57) ABSTRACT

The present invention is aimed to provide a high-performance single-sided double-layer optical recording medium with reduced crosstalk between recording marks, wherein favorable recording signal properties are obtained even from the second recording layer located more distant from the substrate to which the light is applied, and reproducing method thereof, and an optical recording and reproducing apparatus. The optical recording medium possesses the following aspects: the optical recording medium comprises a first substrate, a first information layer, an intermediate layer, a second information layer and a second substrate in this order; the first information layer comprises a first recording layer; the second information layer comprises a second reflective layer, a second recording layer with an organic dye and a protective layer; and the pyrolysis temperature range, the DTA peak width of the thermal analysis on the organic dye in the second recording layer, is 45° C. or less.

16 Claims, 4 Drawing Sheets

FOREIGN PATENT DOCUMENTS

| | | |
|---|---|---|
| JP | 2003 231359 | 8/2003 |
| JP | 2003 331473 | 11/2003 |
| JP | 2004 199805 | 7/2004 |
| WO | WO 02/50190 A1 | 6/2002 |
| WO | 2004 021336 | 3/2004 |
| WO | WO2006/004172 | 1/2006 |

* cited by examiner

Reproducing Laser Beam

Recording and Reproducing Laser Beam

Recording and Reproducing Laser Beam

Recording and Reproducing Laser Beam

Recording and Reproducing Laser Beam

OPTICAL RECORDING MEDIUM, RECORDING AND REPRODUCING METHOD THEREOF, AND OPTICAL RECORDING AND REPRODUCING APPARATUS

TECHNICAL FIELD

The present invention relates to an optical recording medium (hereinafter referred to as "optical information recording medium" or "information recording medium" sometimes) which is preferably applied particularly to a write once read many DVD disc, a recording and reproducing method thereof, and an optical recording and reproducing apparatus using the optical recording medium.

BACKGROUND ART

In addition to an optical recording medium such as a reproduction-only Digital Versatile Disc (DVD), a recordable DVD (e.g., DVD+RW, DVD+R, DVD-R, DVD-RW and DVD-RAM) has been put to practical use.

The DVD+R and DVD+RW lie at the extension of the conventional technologies for recordable compact discs (CD-R and CD-RWs), and to maintain the reproduction compatibility of the DVD+R and DVD+RW with a reproduction-only DVD, the DVD+R and DVD+RW are designed so that the recording density (e.g., track pitch and signal mark length) and the thickness of substrate are compatible with those of CDs. For example, a DVD+R is manufactured in the same manner as a CD-R that an information recording substrate, where a recording layer is formed on a substrate and a reflective layer on the recording layer, is laminated with another substrate of the same configuration as the same form as the first substrate. The recording layer usually comprises a dye material.

Regarding the CD-R, its recording layer also comprises a dye material. One of the features of the CD-R is to have a high reflectivity (65%) satisfying CD standards. To obtain a high reflectivity with the above-noted configuration, however, it is necessary that the recording layer satisfies a specific complex refractive index at a recording and reproducing light wavelength and that the light absorption characteristics of the dye is appropriate. These are the properties that are to be satisfied as well for DVDs.

To increase the recording capacity of the existing reproduction-only DVD, a reproduction-only DVD having two recording layers has been proposed. For example, FIG. 1 is a cross-sectional view schematically showing a layer composition of a DVD having two recording layers. A first substrate 101 and a second substrate 102 are laminated to each other through an intermediate layer 105 comprising a UV-cure resin. On the inner surface of the first substrate 101, a first recoding layer 103 is formed, and on the inner surface of the second substrate 102, a second recoding layer 104 is formed. The first recoding layer 103 is formed as a translucent film of a dielectric film. The second recoding layer 104 is formed as a reflective film of a metal film. On the first recoding layer 103, convexo-concave recording marks are formed, and by the effect of reflecting and interfering a reproduction laser, recording signals are read. In the DVD shown in FIG. 1, signals are read in the two recording layers; therefore, the DVD may obtain a memory capacity of up to 8.5 GB.

Each of the first substrate 101 and the second substrate 102 has a thickness of approximately 0.6 mm, and the intermediate layer 105 has a thickness of approximately 50 µm. The translucent film as the first recording layer 103 is formed so that its reflectivity is around 30%; a laser applied to reproduce the second recording layer 104 is attenuated in the first recording layer 103 by about 30% of the whole laser intensity due to reflection. Thereafter, the attenuated laser is reflected at the reflective film of the second recording layer 104, and after the laser is attenuated once again at the first recording layer 103, the laser emerges from the optical recording medium. By focusing the laser as a reproducing light on the first recording layer or the second recording layer and detecting the reflected light, signals of each of the recording layers may be reproduced. Meanwhile, regarding a DVD, a laser used for recording and reproducing has a wavelength of about 650 nm.

However, up to the present date, there only exist recordable DVDS, DVD+Rs, DVD-Rs and DVD+RWs with one recording layer readable from one surface. In order to increase the memory capacity of these optical recording media, it is necessary that the information is reproduced from the both surfaces for the following reason. A single-sided double-layer optical recording medium for recording and reproducing comprises a first recording layer and a second recording layer, and when a signal is being recorded by applying a laser that is brought to focus on the second recording layer, which is located more distant from the optical pickup, the light absorption and light reflection required for recording on the second layer are incompatible due to the attenuation of the laser in the first recording layer.

For example, Patent Literature 1 proposes a configuration wherein, in recording, it is possible from one side of the optical recording medium to write in two recording layers that comprise an organic dye, and in reproducing, it is also possible from one side of the optical recording medium to read out from the two recording layers. However, this literature only proposes a configuration where two existing types of substrates, one configured such that a laser is applied on the surface of the substrate for recording and the other configured such that a laser is applied from the surface of the recording layer, are laminated, and the above-noted problem regarding the absorption and reflection of light in the second recording layer remains unsolved. Also, this patent literature does not disclose any verification results of recording signals. In addition, there is a problem that it is difficult to form a recording mark on the second recording layer because the configuration of the recording medium is different from those of the conventional CD-R and DVD+R.

A conventional single-layer optical recording medium comprises a substrate, a pigment layer, a reflective layer and a protective layer in this order from the side of the incoming light. On the contrary, the second recording layer of a double-layer optical recording medium comprises a laminating layer, (an inorganic protective layer), a recording layer, a reflective layer and a substrate in this order from the side of the incoming light, wherein the light has been transmitted through the first recording layer, and the environment of recording mark formation in the recording layer (an adjacent layer) is different. Hence, there are difficulties in achieving recording and reproducing properties such as modulation and jitter which are compliant to DVD systems.

Further, Patent Literatures 2 and 3 propose an optical recording medium, wherein the second recording layer of a double-layer optical recording medium comprises a laminating layer, an inorganic protective layer, a recording layer, a reflective layer and a substrate in this order from the side of an incoming light transmitted through the first recording layer. However, these patent documents disclose only the existence and absence of a recording mark (modulation), and the proposals thereof are equivalent to the one described in Patent Literature 1, that is, a configuration where two types of substrates, one configured such that a laser is applied to the surface of the substrate for recording and the other configured such that a laser is applied to the surface of the recording layer, are laminated; and the problem regarding the recording and reproducing remains unsolved.

On the other hand, regarding the existing single-layer optical recording medium, Patent Literatures 4 to 7, for example, discuss a mass decrease property during the pyrolysis of a pigment used for a recording layer. However, in these prior art, the performance in the formation of recording marks in the second recording layer in the case of a single-sided double-layer optical recording medium is not yet sufficient. Hence, as it stands, more improvements are desired.

| Patent Literature 1 | Japanese Patent Application Laid-Open (JP-A) No. 11-66622 |
|---|---|
| Patent Literature 2 | JP-A No. 2000-311384 |
| Patent Literature 3 | JP-A No. 2003-331473 |
| Patent Literature 4 | Japanese Patent (JP-B) No. 3074715 |
| Patent Literature 5 | JP-A No. 09-58123 |
| Patent Literature 6 | JP-A No. 10-188341 |
| Patent Literature 7 | JP-A No. 11-134708 |

DISCLOSURE OF INVENTION

The object of the present invention is to provide a high-performance single-sided double-layer optical recording medium comprising a first recording layer and a second recording layer, wherein favorable recording signal properties may be obtained in the second recording layer which is located more distant from the substrate to which the laser is applied and the amount of crosstalk is reduced; an optical recording and reproducing method thereof, and an optical recording apparatus using the above-noted recording medium.

An optical recording medium of the present invention comprises:
a first substrate,
a first information layer,
an intermediate layer,
a second information layer and
a second substrate in this order,
wherein the first information layer comprises a first recording layer, and
the second information layer comprises a second reflective layer, a second recording layer comprising an organic dye and a protective layer, and
the pyrolysis temperature range, which corresponds to the DTA peak width based on the thermal analysis of the organic dye in the second recording layer, is 45° C. or less.

In the optical recording medium of the present invention, because the DTA peak width based on the thermal analysis of an organic dye in the second recording layer, a pyrolysis temperature range, is 45C.° or less, favorable recording signal properties may be obtained even from the second recording layer which is located more distant from the light entering direction, superior recording signal properties with reduced amount of crosstalk between recording marks may be obtained.

Preferably, an optical recording medium of the present invention possesses the following aspects: by applying a light to the surface of the first substrate of the optical recording medium, the information is at least either recorded or reproduced on the first recording layer and the second recording layer; the pyrolysis temperature range in the second layer is 20° C. or less; the pyrolysis temperature, which corresponds to the DTA peak value based on the thermal analysis, of the organic dye in the second recording layer is 200° C. to 350° C.; either one of the maximum absorption wavelength and the absorption peak wavelength of the organic dye in the second recording layer lies in the range of 580 nm and 620 nm; the organic dye in the second recording layer comprises a compound selected from squarylium metal chelate compounds; the thickness of the second recording layer is 50 nm to 100 nm; the first information layer comprising the first recording layer is only for reproduction, and the first recording layer comprises a reflective film; the first information layer comprises the first recording layer with the organic dye and a first reflective layer; a protective layer comprises ZnS; the thickness of the protective layer is 80 nm to 180 nm; the second reflective layer comprises any one of Au, Al, Ag and an alloy based on these metals; the thickness of the intermediate layer is 40 nm to 70 nm; and the second substrate comprises guide grooves, and the depth of the guide grooves is 20 nm to 60 nm.

With the recording and reproducing method of the optical recording medium according to the present invention, by applying a light with a wavelength of 580 nm to 720 nm to the surface of the first substrate of the optical recording medium, the information is at least either recorded or reproduced on the first recording layer and the second recording layer.

With the recording and reproducing method of the optical recording medium according to the present invention, information may be stably recorded and reproduced because the amount of crosstalk between recording marks may be suppressed, and favorable recording signal properties may be obtained from the second recording layer located more distant from the substrate to which a laser is applied.

An optical recording and reproducing apparatus of the present invention comprises
a light source and
the optical recording medium of the present invention
wherein, by applying a light with a wavelength of 580 nm to 720 nm to the surface of the first substrate of the optical recording medium, the information is at least either recorded or reproduced on the first recording layer and the second recording layer.

Regarding the recording and reproducing apparatus of the present invention, information may be stably recorded and reproduced because the amount of crosstalk between the recording marks may be reduced and favorable recording signal properties may be obtained from the second recording layer located more distant from the substrate to which the light is applied.

Figure 1:
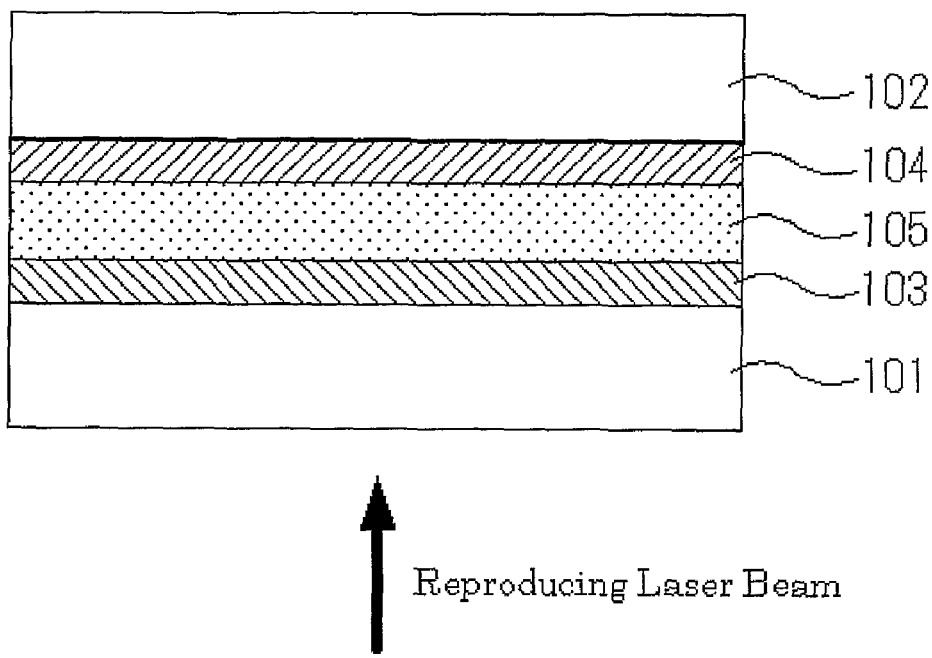
FIG. 1 is a sectional view schematically showing an example of the layer composition of a conventional optical recording medium.

BEST MODE FOR CARRYING OUT THE INVENTION (Optical Recording Medium)

The optical recording medium according to the present invention comprises a first substrate, a first information layer, an intermediate layer, a second information layer and a second substrate in this order; and optionally other layers.

Regarding the optical recording medium, by applying a light to the surface of the first substrate of the optical recording medium, the information on the first recording layer and the second recording layer is at least either recorded or reproduced.

In the first configuration of the present invention, the first information layer of the optical recording medium comprises information pits which form a reproduction-only first recording layer comprising a reflective layer; and optionally other layers such as a protective layer, an undercoat layer and a hard-coated layer.

In the second configuration of the present invention, the first information layer of the optical recording medium comprises a first recording layer with an organic dye and a first reflective layer; and optionally other layers such as a protective layer, an undercoat layer and a hard-coated layer.

In addition, the second information layer comprises a protective layer, a second recording layer with an organic dye and a reflective layer, layered in this oreder mentioned from the surface side of the light incident plane; and optionally other layers.

In the single-sided double-layer optical recording medium with a first recording layer and a second recording layer, when a recording mark is formed in the second recording layer with the light which has been attenuated in the first recording layer and the second reflective layer, light attenuation occurs by the amount of light absorbed in the first recording layer compared to a double-layer ROM such as a DVD-ROM. As a result, it is difficult to achieve a recording sensitivity in the second recording layer. Also, in the second recording layer, a focus offset tends to take place due to an optical aberration; a recording mark is spread, and thus a problem that the occurrences of crosstalk to adjacent tracks tend to increase. Further, regarding the crosstalk, the shape of grooves formed in the second substrate is a factor to increase the occurrences of crosstalk. In other words, when the polarity of the contours is oriented as viewed from the light entrance plane, a recording mark is formed on lands (convex part). Therefore, grooves are ineffective in preventing the marks from spreading. Even when the recording mark is formed on the lands, since the main reflecting surface of the second recording layer is the interface between the second recording layer and the second reflective layer, it is necessary to reduce the depth of the grooves compared to that of the first recording layer in order to obtain the reflectivity equivalent to that of the first recording layer. This also causes a tendency to increase the occurrences of crosstalk in the second layer.

Therefore, in the present invention, to secure jitter by suppressing the recording sensitivity and the spread of recording marks in the second recording layer, the following countermeasures are taken: (i) a material that is able to form a recording mark which does not accompany thermal deformation in recording is selected; (ii) a protective layer is formed as a deformation-preventing layer adjacent to the second recording layer in order to prevent thermal deformation; and (iii) the depth of the guide grooves in the second substrate is adjusted so that a high reflectivity in the second recording layer is obtained.

Hereinafter, the above-noted items (i) to (iii) are described in detail.

First of all, regarding item (i), the pyrolysis temperature range of the organic dye comprised in the second recording layer is preferably 45° C. or less, more preferably 20° C. or less. Here, the pyrolysis temperature means the peak value of Differential Thermal Analysis (DTA) in a thermal analysis, where the rate of temperature increase is 10° C./min and the sample quantity is 5 mg. The pyrolysis temperature range means the temperature range corresponding to the DTA peak width. By forming a second recording layer comprising an organic dye as described above, favorable recording signal properties with less crosstalk may be achieved.

In addition, the pyrolysis temperature of the organic dye comprised in the second recording layer is preferably 200° C. to 350° C., more preferably 250° C. to 350° C. When the pyrolysis temperature exceeds 350° C., the recording sensitivity tends to decline. When it is below 200° C., the thermal stability is impaired as well as the recording mark tends to spread.

A squarylium metal chelate compound, described in detail hereinafter, is a preferable example of an organic dye in the second recording layer.

Figure 7:
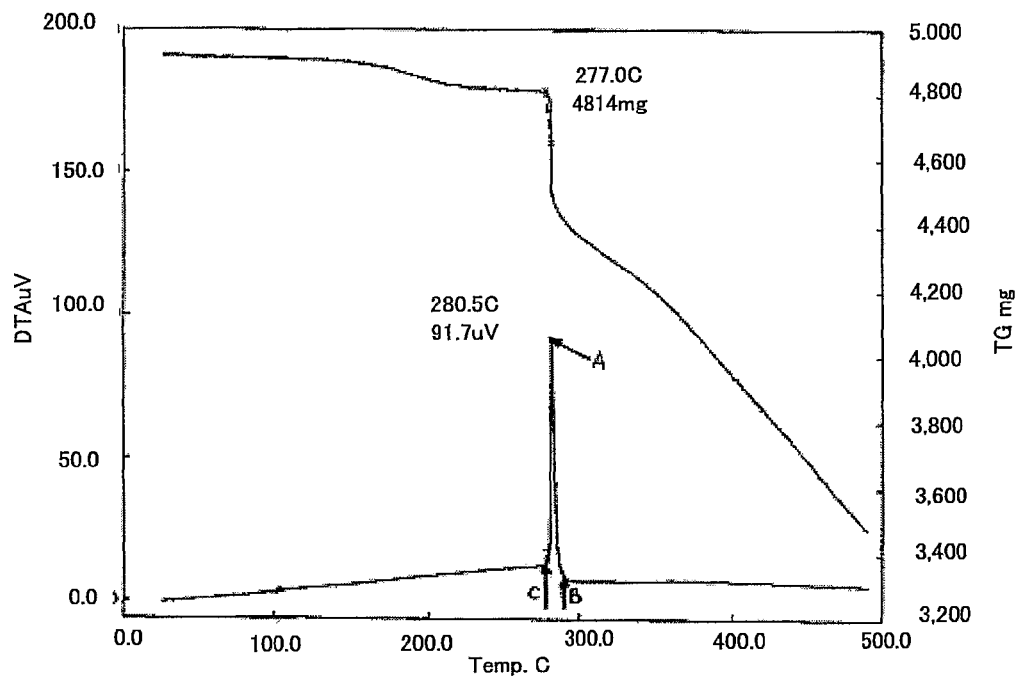
FIG. 7 is a thermal analysis chart of a squarylium metal chelate compound.

Here, FIG. 7 shows the result of the thermal analysis on a squarylium metal chelate compound represented by Formula (1) below. The results of this pyrolysis chart indicate that the squarylium metal chelate compound represented by the formula below has a DTA peak value at point A (approximately 280° C.) and the DTA peak width of B-C (approximately 15° C.).

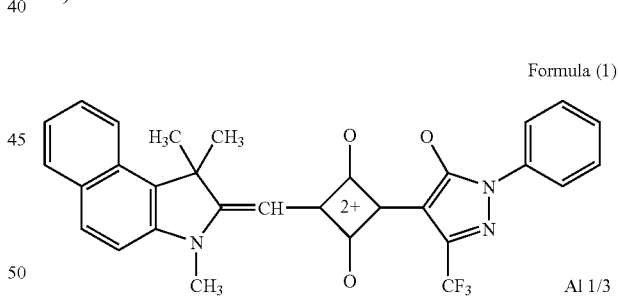

Formula (1)

The second recording layer has a thickness of preferably 50 nm to 100 nm (500 Å to 1,000 Å), more preferably 60 nm to 90 nm. When the thickness of the second recording layer is less than 50 nm, favorable jitter properties of the optical recording medium may not be obtained. On the other hand, when the thickness of the second recording layer is greater than 100 nm, the crosstalk and jitter of the optical recording medium tend to increase. The ratio of the thickness of the second recording layer at a guide groove to that at a land is preferably 0.8 to 1.0.

Figure 6:
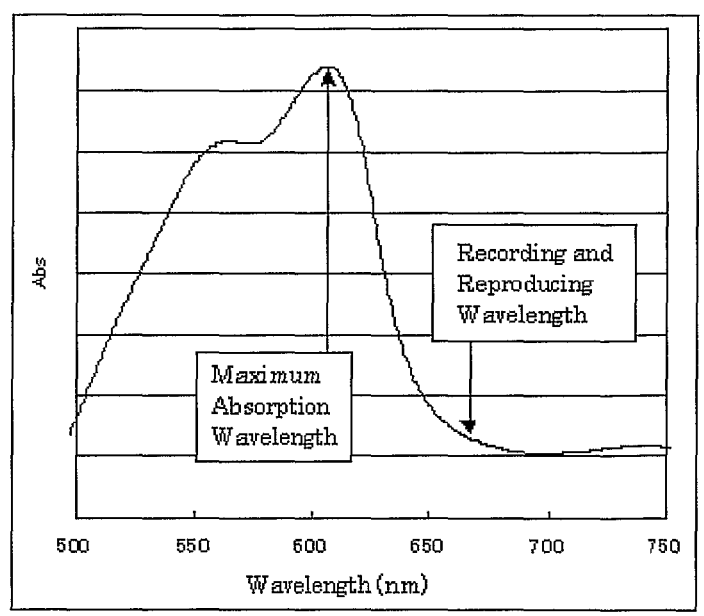
FIG. 6 shows a relation between the maximum absorption wavelength and the recording and reproducing wavelength in the absorption spectrum of the organic dye used for a recording layer.

The light absorption by the second recording layer may be controlled by adjusting the thickness of the second recording layer or the light absorption properties of the organic dye. The maximum absorption wavelength and the recording and reproducing wavelength of the organic dye used for the second recording layer are configured such that they have a relation shown in FIG. 6. Although, in FIG. 6 the maximum absorption wavelength and the absorption peak wavelength coincide with each other, there are cases where they do not. If this is the case, the absorption peak wavelength instead of the maximum absorption wavelength and the recording and reproducing wavelength are configured to have a relation similar to that in FIG. 6. In order to achieve superior recording signal properties with regard to DVD recording and reproducing laser wavelength, the maximum absorption wavelength or the absorption peak wavelength of the organic dye is preferably 580 nm to 620 nm. When the maximum absorption wavelength or the absorption peak wavelength is below this range, the recording sensitivity is insufficient, and when it is above this range, it is difficult to obtain reflectance.

Next, regarding the item (ii), since the protective layer formed on the second recording layer is also effective as a barrier layer protecting the second recording layer from the intermediate layer, two substrates may be easily laminated to each other with an adhesive as the intermediate layer dissolving the organic dye.

Preferred examples of the material used for disposing the protective layer include an inorganic substance having a high light transmittance such as SiO, $SiO_2$, $MgF_2$, $SnO_2$, SnS, ZnS and ZnS—$SiO_2$. Among them, a material mainly comprising ZnS, which has a low crystallinity and a high reflectivity, is most preferred.

Preferred examples of the material comprising mainly ZnS include ZnS—$SiO_2$, ZnS—SiC, ZnS—Si, ZnS—Ge, ZnS—ZnO—GaN and ZnS—ZnO—$In_2O_3$—$Ga_2O_3$. The ratio of ZnS content in these materials is preferably 60% by mole to 90% by mole, in terms of the crystallinity.

The thickness of the protective layer is not restricted and may be properly selected depending on the application. The thickness is preferably 80 nm to 180 nm (800 Å to 1,800 Å). When the thickness is less than 80 nm (800 Å), the modulation (contrast) of recording signals may be unsatisfactory. The thickness of the protective layer is preferably 180 nm (1,800 Å) or less in order for the protective layer to function as a deformation preventing layer.

Further, regarding the item (iii), a guide groove in the second substrate has a depth of preferably 20 nm to 60 nm (200 Å to 600 Å). By forming the guide groove in the second substrate having a depth in the above-noted range, the attenuation of the reflected light by the guide groove in the second substrate may be suppressed, so that a high reflectivity in the second recording layer may be easily obtained.

Figure 4:
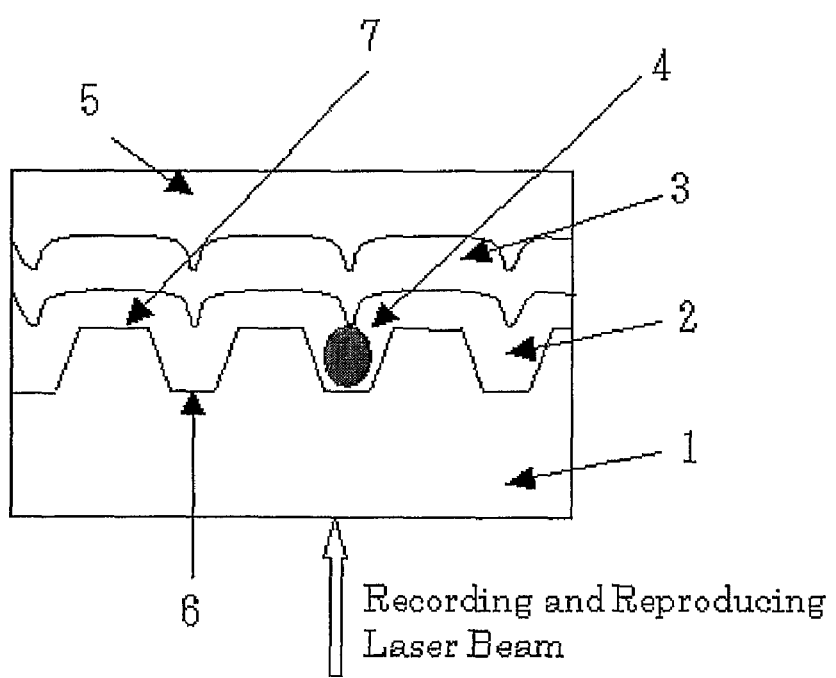
FIG. 4 is a sectional view schematically showing an example of the layer composition of the first information layer of the optical recording medium according to the present invention.
Figure 5:
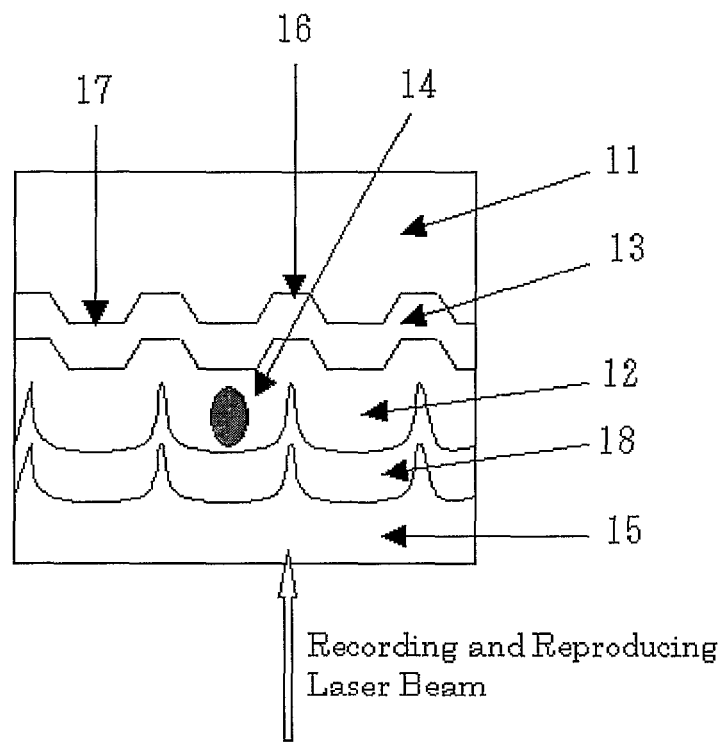
FIG. 5 is a sectional view schematically showing an example of the layer composition of the second information layer in the optical recording medium according to the present invention.

Here, examples of the layer composition of the optical recording medium according to the present invention are schematically shown in FIGS. 4 and 5.

FIG. 4 shows a first information layer. FIG. 4 comprises a first substrate 1; a first dye recording layer 2; a first reflective layer 3; a recording mark 4; a transparent intermediate layer 5; a groove 6; and a land 7. The recording mark 4, formed in the first information layer, is formed at the groove 6 of the first substrate.

FIG. 5 shows a second information layer. FIG. 5 comprises a second substrate 11; a second recording layer 12; a second reflective layer 13; a second recording mark 14; a transparent intermediate layer 15; a groove 16; a land 17; and an inorganic protective layer 18. The recording mark 14, formed in the second information layer, is formed at the land 17 of the second substrate.

As shown in FIGS. 4 and 5, the shapes of the grooves formed in the first substrate and the second substrate are not identical. For example, regarding a DVD+R or a DVD−R having a memory capacity of 4.7 GB and a track pitch of 0.74 μm, the grooves of the first substrate have a depth of preferably 150 nm to 200 nm (1,500 Å to 2,000 Å) and a width (at the bottom of the grooves) of preferably 0.1 μm to 0.35 μm. This is because, as indicated in FIG. 4, the above-noted ranges of the depth and width of the grooves formed in the first substrate is appropriate to utilize the interface reflection, for there is a tendency that an organic dye tends fill the grooves when the first recording layer is formed by spin coat method, and accordingly the shape of the interface between the first recording layer and the first reflective layer is determined based on the amount of the coating liquid filled and the shapes of the grooves in the first substrate.

Another reason is, as shown in FIG. 5, that the interface shape between the second recording layer and the reflective layer is determined by the groove shape of the second substrate, and the above-noted groove depth is suitable for utilizing the interface reflection. Regarding the recording and reproducing wavelength (approximately 650 nm), the guide grooves of the second substrate have a width (at the bottom of the grooves) of preferably 0.1 μm to 0.35 μm. The grooves with greater width or depth than the above-noted range result in low reflectivity; on the other hand, grooves with smaller depth or width than the above-noted range result in the increase of jitter due to the irregularities in the shape of the recording marks.

Next, the configuration of the optical recording medium according to the present invention is described in detail with reference to figures.

Figure 2:
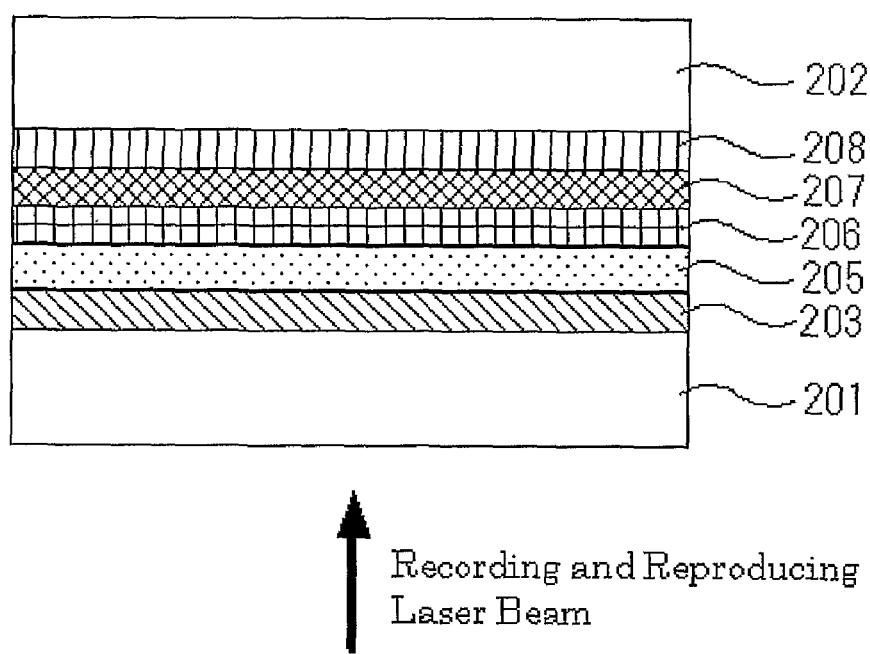
FIG. 2 is a sectional view schematically showing an example of the layer composition of the optical recording medium according to the present invention.

FIG. 2 shows an exemplary layer composition of the optical recording medium according to the first configuration of the present invention. In this example, a first recording layer 203 is only for reproducing while a second recording layer 207 is for recording and reproducing. FIG. 2 comprises a first substrate 201; a second substrate 202; a first reproduction-only recording layer 203 comprising a reflecting film; an intermediate layer 205; a protective layer 206; a second recording layer 207 comprising an organic dye; and a second reflective layer 208. Recording and reproducing are performed by applying a light to the surface of the first substrate.

Figure 3:
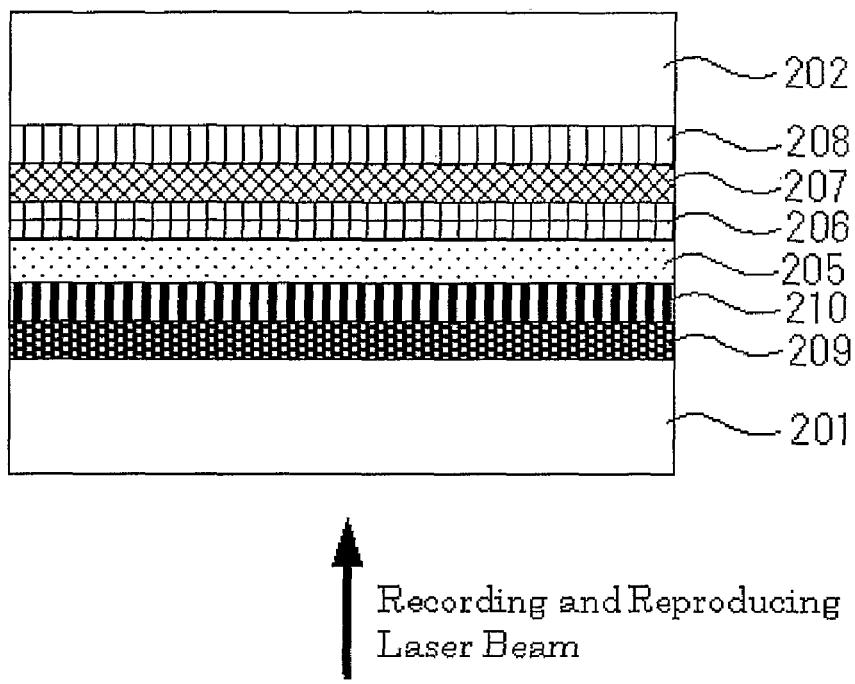
FIG. 3 is a sectional view schematically showing another example of the layer composition of the optical recording medium according to the present invention.

FIG. 3 shows an exemplary layer composition of the optical recording medium according to the second configuration of the present invention. In this example, both a first recording layer 209 and a second recording layer 207 are for recording and reproducing. FIG. 3 comprises a first substrate 201; the first recording layer 209 comprising an organic dye; a first reflective layer 210; a second substrate 202; an intermediate layer 205; a protective layer 206; the second recording layer 207 comprising an organic dye; and a second reflective layer 208. Recording and reproducing are performed by applying a light to the surface of the first substrate.

Meanwhile, one of the characteristics of the present invention is the use of an organic dye with particular pyrolysis properties in the second recording layer. This characteristic may be applied to a single-layer optical recording medium, which lacks a first recording layer in FIGS. 2 and 3.

The optical recording medium of the present invention has a configuration wherein a high reflectivity may be obtained due to a multi-interfering effect at the both interfaces of a recording layer comprising an organic dye (a dye recording layer) as in the cases of DVD+Rs and CD-Rs. The recording layer preferably has a large refractive index n and a relatively small extinction coefficient k; more preferably, n is greater than 2, and k is greater than 0.03 and less than 0.2. Such optical properties may be obtained by utilizing the properties of the long-wave end in the light absorption band of the dye recording layer.

-Recording Layer-

As described above, there are two types of first recording layers in the first information layer. One comprises a reflective film only for reproduction, and another comprising an organic dye. The second recording layer of the second information layer comprises an organic dye that satisfies the above-mentioned pyrolysis temperature and pyrolysis temperature range.

The reflective film is formed by a film made of, for example, a metal or an alloy similar to the material for the reflective layer described hereinafter, and forms information pits.

The organic dye material used for the first recording layer and the second recording layer is not restricted and y be properly selected depending on the application, Examples of the organic dye include a cyanine dye, an azo dye, a tetraazaporphyarzine dye, a phthalocyanine dye, a pyrylium dye, a thiopyrylium dye, an azulenium dye, a squarylium dye, a squarylium metal chelate compound, a formazan chelate dye, a metal (such as Ni and Cr) complex salt dye, a naphthoquinone dye, an anthraquinone dye, an indophenol dye, an indoaniline dye, a triphenylmethane dye, a triallylmethane dye, an aminium dye, a diimmonium dye and a nitroso compound dye. Among them, at least one type of dye is preferably selected from a tetraazaporphyrazine dye, a cyanine dye, an azo dye, a squarylium dye or squarylium metal chelate compounds for the following advantages: the maximum absorption wavelength or absorption peak wavelength of the light absorption spectrum of the film lies in the range of 580 nm and 620 nm, and the desired optical properties may be easily achieved with the laser wavelength of approximately 650 nm; a film may be easily deposited by an application of solvent; and the optical properties may be easily adjusted. A squarylium metal chelate compound is particularly preferable for a second recording layer for the easiness to achieve the desired pyrolysis properties.

The squarylium metal chelate compound are preferably composed of a squarylium compound and metals as shown in Formula (2) below, for example. The squarylium compounds and its metal chelate compounds may be produced according to a method described in or based on International Publication No. WO02/50190.

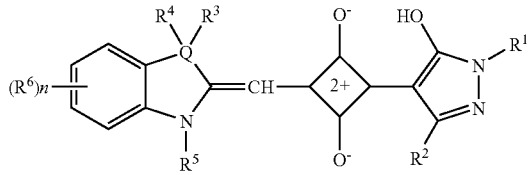

Formula (2)

In the Formula (2), Q represents a carbon atom or a nitrogen atom.

Also, $R^1$ represents any one of an alkyl group which may have a substituent; an aryl group which may have a substituent; and a heterocyclic group which may have a substituent.

In addition, $R^2$ represents any one of a hydrogen atom; an alkyl group which may have a substituent; an alkoxy group which may have a substituent; an aralkyl group which may have a substituent; an aryl group which may have a substituent; an amino group which may have a substituent; and a heterocyclic group which may have a substituent.

$R^3$ and $R^4$ may be identical to or different from each other, and they represent an alkyl group which may have a substituent; $R^3$ and $R^4$ may form an alicyclic hydrocarbon ring or a heterocyclic ring which may have a substituent through a bond between adjacent carbon atoms in $R^3$ and $R^4$.

However, $R^4$ does not exist when Q represents a nitrogen atom. $R^5$ represents any one of a hydrogen atom; an alkyl group which may have a substituent; an aralkyl group which may have a substituent; and an aryl group which may have a substituent.

$R^6$ represents any one of a halogen atom; an alkyl group which may have a substituent; an aralkyl group which may have a substituent; an aryl group which may have a substituent; trifluoromethyl group; a nitro group; a cyano group; and an alkoxy group which may have a substituent.

Regarding n, n is an integer of zero to four. When n is two to four, $R^6$s may be identical to or different from each other. In addition, two $R^6$s adjacent to each other may form an aromatic ring, which may have a substituent, through a bond between adjacent carbon atoms in $R^6$s.

In Formula (2), the alkyl portion of the alkyl group and alkoxy groups is a straight chain or a branched chain with carbon number of preferably one to 15, more preferably one to eight. Examples thereof include an alkyl group and a cyclic alkyl group with carbon number of three to eight such as: a methyl group, an ethyl group, a propyl group, an isopropyl group, a butyl group, an isobutyl group, a sec-butyl group, a tert-butyl group, a pentyl group, an isopentyl group, a 1-methylbutyl group, a 2-methylbutyl group, a tert-pentyl group, a hexyl group, a cyclopropyl group, a cyclobutyl group, a cyclopentyl group, a cyclohexyl group, a cycloheptyl group and a cyclooctyl group.

The aralkyl group preferably has a carbon number of seven to 19, more preferably seven to 15. Specific examples thereof include a benzyl group, a phenetyl group, a phenylpropyl group and a naphthylmethyl group.

The aryl group preferably has a carbon number of six to 18, more preferably six to 14. Specific examples thereof include a phenyl group, a naphthyl group, an anthryl group and an azulenyl group.

Specific examples of the halogen atom include a chlorine atom, a bromine atom, a fluorine atom and an iodine atom.

Examples of the heterocyclic ring are those derived from various heterocyclic compounds comprising a hetero atom such as a nitrogen atom, an oxygen atom, a sulfur atom and a selenium atom. In this heterocyclic ring, the number of atoms comprising the heterocyclic ring is the total number of atoms that comprises the ring including the hetero atom, and it is preferably five to eight, more preferably five to six.

In addition, the heterocyclic ring comprises, other than monocyclic rings, a fused polycyclic heterocyclic compound with multiple (preferably two to eight, more preferably two to six) hetero-monocyclic rings or a heterocyclic ring with a chain polycyclic configuration integrated. Moreover, the heterocyclic ring preferably comprises a carbocycle-fused carbocyclic ring to which a carbon ring such as a benzene ring and a naphthalene ring is fused.

Meanwhile, the heterocyclic ring includes an aromatic heterocyclic ring and an aliphatic heterocyclic ring.

Specific examples thereof include a pyridine ring, a pyrazine ring, a pyrimidine ring, a pyridazine ring, a quinoline ring, an isoquinoline ring, a phthalazine ring, a quinazoline ring, a quinoxaline ring, a naphthyridine ring, a cinnoline ring, a pyrrole ring, a pyrazole ring, an imidazole ring, a triazole ring, a tetrazole ring, a thiophene ring, a furan ring, a thiazole ring, an oxazole ring, an indole ring, an isoindole ring, an indazole ring, a benzoimidazole ring, a benzotriazole ring, a benzothiazole ring, a bezooxazole ring, a purine ring, a carbazole ring, a pyrrolidine ring, a piperidine ring, a piperazine ring, a morpholine ring, a thiomorpholine ring, a homopiperidine ring, a homopiperazine ring, a tetrahydropyridine ring, a tetrahydroquinoline ring, a tetrahydroisoquinoline ring, a tetrahydrofuran ring, a tetrahydropyran ring, a dihydrobenzofuran ring and a tetrahydrocarbazole ring.

$R^3$ and $R^4$ may form an alicyclic hydrocarbon ring or a heterocyclic ring with adjacent carbon atoms. The alicyclic hydrocarbon ring has a carbon number of three to eight, and it may be saturated or unsaturated. Specific examples thereof include a cyclopropane ring, a cyclobutane ring, a cyclopentane ring, a cyclohexane ring, a cycloheptane ring, a cyclooctane ring, a cyclopentene ring, a 1,3-cyclopentadiene ring, a cyclohexene ring and a cyclohexadiene ring. Examples of a heterocyclic ring are equivalent to those for the heterocyclic ring mentioned above.

Preferred examples of the aromatic ring which is formed through a bond between carbon atoms in two adjacent $R^6$s include a benzene ring and a naphthalene ring.

Examples of the substituent in the alkyl group include a hydroxyl group, a carboxyl group, a halogen atom and an alkoxy group. Examples for the alkyl portion of the alkoxy group are equivalent to those mentioned above.

Examples of the substituent in the aralkyl group, the aryl group, the alkoxy group, the heterocyclic group, the aromatic ring and the alicyclic hydrocarbon ring include commonly used substituents such as a hydroxyl group, a carboxyl group, a halogen atom, substituted or unsubstituted alkyl group, an alkoxy group, a nitro group and a substituted or unsubstituted amino group. Examples of the alkyl portion of the alkyl group or the alkoxy group are equivalent to those mentioned above. The substituted amino group includes a monoalkyl-substituted amino group and a dialkyl-substituted amino group. Examples of the alkyl group for the substituted amino group are also equivalent to those mentioned above.

The number of the substituents bonded to each group is not restricted and may be properly selected depending on the application. For example, the number is preferably one or more, more preferably two to five.

The metal preferably comprises two to three ligands. Examples of the metal include aluminum, zinc, copper, iron, nickel, chromium, cobalt, manganese, iridium, vanadium and titanium. Particularly, a squarylium metal chelate compound comprising aluminum exhibits excellent optical properties as an optical recording material.

The first recording layer and the second recording layer may comprise other components such as a polymeric material, a stabilizer, a dispersant, a flame-retardant, a lubricant, an antistatic agent, a surfactant and a plasticizer depending on the application.

Specific examples of the polymeric material include various materials such as ionomer resin, a polyamide resin, a polyvinyl resin, a natural polymer, a silicone and a liquid rubber; and a silane coupling agent, which may be dispersively mixed. Examples of a stabilizer include a transition metal complex.

The first recording layer and the second recording layer may be formed by means of any ordinary method such as vapor deposition method, spattering method, chemical vapor deposition (CVD) method and solution coating method, and they may be manufactured through a production method of an optical recording medium described hereinafter.

The first recording layer has a thickness of preferably 10 nm to 500 nm (100 Å to 5,000 Å), more preferably 40 nm to 80 nm (400 Å to 800 Å). When the thickness of the first recording layer is less than 10 nm, the recording sensitivity of the first recording layer may be reduced. On the other hand, when the thickness is more than 500 nm, the reflectivity in the first recording layer may be reduced.

-Substrate-

A substrate should be transparent to the used laser only in the case of recording and reproducing by applying the laser to the surface of the substrate; in the case of recording and reproducing from the recording layer, the substrate is not necessary transparent. Therefore, since in the present invention a light with a recording wavelength of 580 nm to 720 nm is applied to the surface of the first substrate, as long as the first substrate is transparent, the transparency of the second substrate is insignificant.

The material for the substrate is not restricted and may be properly selected depending on the application. Examples of the material for the substrate include a plastic such as a polyester resin, an acrylic resin, a polyamide resin, a polycarbonate resin, a polyolefin resin, a phenol resin, an epoxy resin and a polyimide resin; a glass; a ceramic; and a metal.

The substrate usually has a shape of a disc. Usually, the track pitch is preferably 0.7 μm to 1.0 μm; for the optical recording medium having a large capacity, the track pitch is preferably 0.7 μm to 0.8 μm.

-First and Second Reflective Layers-

As a material used for the reflective layer, a material having a high reflectivity to a laser is preferred. Examples of the preferred material include a metal and a semi-metal such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ca, In, Si, Ge, Te, Pb, Po, Sn and SiC. Among them, in terms of higher reflectivity, Au, Ag and Al are most preferred. These materials may be used individually or in combination, or as an alloy thereof.

The reflective layer has a thickness of preferably 5 nm to 300 nm (50 Å to 3,000 Å), more preferably 5 nm to 30 nm (50 Å to 300 Å), still more preferably 10 nm to 15 nm (100 Å to 150 Å). In the cases where the first recording layer comprises a reflective film used only for reproduction or the first recording layer comprises an organic dye and the reflective layer is formed on the first recording layer, it is preferred that the thickness of the reflective layer is controlled so that the light transmittance of the reflective layer is 40% or greater. A thicker reflective layer tends reduce the light transmittance. To secure the durability while maintaining the thickness within the above-noted range, an alloy consisting Ag, which has the highest reflective and transmissive efficiencies, is preferable as a main material as well as a small amount of metals such as Nd, Cu, Pd and In. In general, the amount of the accessory metals is preferably 0.2% by mass to 2% by mass.

The thickness of the second reflective layer is not restricted and may be properly selected depending on the application. The thickness of the second reflective layer is preferably 100 nm to 300 nm (1,000 Å to 3,000 Å).

-Intermediate Layer-

Regarding the intermediate layer, the material is not restricted as long as the material glues the first information layer and the second information layer, and it may be properly selected depending on the application. In terms of productivity, the material is preferably an acrylate-, epoxy- or urethane-based UV-cure or thermosetting adhesive and a hot-melt adhesive.

The thickness of the intermediate layer is not restricted and may be properly selected according to the optical condition of the recording and reproducing system. The thickness of the intermediate layer for a DVD system is preferably 40 μm to 70 μm.

The optical recording medium of the present invention may optionally comprise a substrate-surface hard-coated layer, an undercoat layer, and other layers.

The substrate-surface hard-coated layer is used for the following purposes: (1) protection of the recording layer (absorbing/reflective layer) from scratch, dust and dirt, (2) improvement in the preservation stability of the recording layer (absorbing/reflective layer) and (3) improvement in reflectivity. For these purposes, an inorganic material or an organic material may be used. Examples of the preferred inorganic material include SiO and $SiO_2$. Examples of the preferred organic material include a polymethylacrylate resin, a polycarbonate resin, an epoxy resin, a polystyrene resin, a polyester resin, a vinyl resin, a cellulose, an aliphatic hydrocarbon resin, an aromatic hydrocarbon resin, a natural rubber, a styrene-butadiene resin, an acrylate-based UV-cure adhesive, an epoxy-based UV-cure adhesive, an urethane-based UV-cure adhesive, a chloroprene rubber, a wax, an alkyd resin, a drying oil and a rosin. Among them, UV-cure resin is the most preferred for its excellent productivity.

The undercoat layer is used for the following purposes: (1) improvement in adhesiveness, (2) barrier from water and gases, (3) improvement in the preservation stability of the recording layer, (4) improvement in reflectivity, (5) protection of the substrate and the recording layer from a solvent and (6) formation of guide grooves, guide pits and preformat.

For the purpose (1), the following may be used: a polymer material such as an ionomer resin, a polyamide resin, a vinyl resin, a natural resin, a natural polymer, a silicone and a liquid rubber; and a silane coupling agent.

For the purposes (2) and (3), besides the above-noted polymer materials, an inorganic compound such as $SiO_2$, $MgF_2$, SiO, $TiO_2$, ZnO, TiN and SiN, and a metal or a semi-metal such as Zn, Cu, Ni, Cr, Ge, Se, Au, Ag and Al may be used.

For the purpose (4), a metal such as Al and Ag, and an organic thin film having a metallic luster such as a thin film made of a methine dye and xanthene dye may be used.

For the purposes (5) and (6), a UV-cure resin, a thermosetting resin and a thermoplastic resin may be used.

The thickness of the undercoat layer is not restricted and may be properly selected depending on the application. The thickness of the undercoat layer is preferably 0.01 µm to 30 µm, more preferably 0.05 µm to 10 µm.

The undercoat layer, protective layer, intermediate layer and substrate-surface hard-coated layer may additionally comprise, just as the recording layer, depending on the application, a stabilizer, a dispersant, a flame-retardant, a lubricant, an antistatic agent, a surfactant and a plasticizer.

(Manufacturing Method of Optical Recording Medium)

The manufacturing method of the optical recording medium according to the present invention comprises a first information layer formation process, a second information layer formation process, a laminating process and optionally other processes.

<First Information Layer Formation Process>

The formation process of a reproduction-only first information layer comprises a formation process of a reflective layer by sputtering on a first substrate on whose surface at least either grooves or pits have already been formed. The formation process of a recording and reproducing first information layer comprises a formation process of a first recording layer by application followed by drying of a coating liquid with an organic dye on a first substrate on whose surface at least either grooves or pits have already been formed. The substrate on which the first recording layer is formed may be produced by the same procedure as conventional DVD+Rs and DVD-ROMs.

-Formation Process of First Recording Layer-

The formation process of a reproduction-only first recording layer comprises a formation process of a reflective layer by sputtering. The formation process of a recording and reproducing first recording layer comprises a formation process of a first recording layer by application followed by drying of a first recording layer coating liquid comprising an organic dye and an organic solvent on a first substrate on whose surface at least either grooves or pits have already been formed.

Exemplary methods for coating with the coating liquid of a first recording layer include a spinner coating method, a spraying method, a roller-coating method, a dipping method and a spin-coating method. Among them, since the thickness may be controlled by adjusting the density, viscosity and drying temperature of the organic solvent of the first recording layer, a spin-coating method is preferable.

The organic solvent is not restricted and may be properly selected depending on the application. Examples of the organic solvent include the following: an alcohol such as methanol, ethanol, isopropyl alcohol and 2,2,3,3-tetrafluoro propanol; a ketone such as acetone, methyl ethyl ketone and cyclohexanone; an amide such as N,N-dimethylformamide and N,N-dimethylacetoamide; a sulfoxide such as dimethylsulfoxide; an ether such as tetrahydrofuran, dioxane, diethyl ether and ethylene glycol monomethyl ether; an ester such as methyl acetate and ethyl acetate; a halogenated aliphatic hydrocarbon such as chloroform, methylene chloride, dichloroethane, carbon tetrachloride and trichloroethane; an aromatic hydrocarbon such as benzene, xylene, monochloro benzene and dichloro benzene; a cellosolve such as methoxy ethanol and ethoxy ethanol; and a hydrocarbon such as hexane, pentane, cyclohexane and methyl cyclohexane.

-First Reflective Layer Formation Process-

The first reflective layer formation process comprises a formation of a reflective layer on a first recording layer by a film formation method.

Examples of the film formation method include a vacuum vapor deposition method, a sputtering method, a plasma-CVD method, a photo-CVD method, an ion plating method and an electron beam evaporation method. Among them, the sputtering method is preferable for its excellent mass-productivity and film quality.

<Second Information Layer Formation Process>

The second information layer formation process comprises a second reflective layer formation process, a second recording layer formation process, a protective layer formation process and optionally other processes. The substrate on which the second recording layer is formed may be produced in the same process as conventional DVD+Rs and DVD-ROMs.

-Second Reflective Layer Formation Process-

The second reflective layer formation process comprises a process of forming a reflective layer on a second substrate on whose surface at least either grooves or pits have been formed by a film formation method.

Examples of the film formation method include a vacuum vapor deposition method, a sputtering method, a plasma-CVD method, a photo-CVD method, an ion plating method and an electron beam evaporation method. Among them, the sputtering method is preferable for its excellent mass-productivity and film quality, -The Second Recording Layer Formation Process- The second recording layer formation process comprises a process of forming a second recording layer by the application followed by drying of a coating liquid comprising an organic dye on the reflective layer. The method of application is identical to that for the first recording layer.

-Protective Layer Formation Process-

The protective layer formation process comprises a process of forming a protective layer on the second recording layer by a film formation method.

Examples of the film formation method include a vacuum vaporization method, a sputtering method, a plasma-CVD method, a photo-CVD method, an ion plating method and an electron beam evaporation method. Among them, the sputtering method is preferable for its excellent mass-productivity and film quality, <Laminating Process>

The laminating process is to laminate a first information layer and a second information layer through an intermediate layer, wherein the first and second recording layers are on the inward side of the optical recording medium.

An adhesive is delivered by drops on the surface of the second information layer on which a protective layer has been formed. After the first information layer is superimposed as well as the adhesive is spread uniformly over the second information layer, the adhesive is hardened by ultraviolet irradiation. The adhesive hardened by the ultraviolet irradiation is preferable because of a high light transmittance.

Examples of the other processes include an undercoat layer formation process and a hard-coated layer formation process.

(Recording and Reproducing Method of Optical Recording Medium)

The recording and reproducing method of the optical recording medium according to the present invention comprises recording and reproducing information on the first recording layer and the second recording layer by applying a light having a recording wavelength of 580 nm to 720 nm to the surface of the first substrate.

Specifically, a recording light such as a semiconductor laser (for example, having an oscillation wavelength of 650 nm) is applied through an objective lens to the surface of the first substrate of the optical recording medium while the optical recording medium is being rotated at a given linear speed or a given constant angle velocity. The first recording layer and the second recording layer absorb the applied light and thereby elevate their local temperature. Then, for example, a pit is formed, causing optical properties of the recording layers to change, and as a result information is recorded. The recorded information may be reproduced by applying a laser on the surface of the first substrate, while rotating the optical recording medium at a given linear speed, and detecting the reflected light.

With the recording and reproducing method of the optical recording medium of the present invention, stable recording and reproducing are possible since the amount of crosstalk between recording marks may be reduced and favorable recording signal properties may be obtained even from the second recording layer.

(Optical Recording and Reproducing Apparatus)

The optical recording and reproducing apparatus of the present invention is an optical recording apparatus that records information by applying a light from a light source to the optical recording medium of the present invention.

The configuration of the optical recording apparatus is not restricted and may be properly selected depending on the application. An example of the optical recording apparatus comprises a laser source from which a laser such as a semiconductor laser is emitted; a collective lens, which collects the laser emitted from the laser source to the optical recording medium mounted on a spindle; a laser detector, which detects a portion of the laser emitted from the laser source; optical elements, which guides the laser emitted from the laser source to the collective lens and the laser detector; and optionally other units.

In the optical recording and reproducing apparatus, the optical elements guide the laser emitted from the laser source to the collective lens; the collective lens condenses the laser and applies it to the optical recording medium; and as a result, recording on the optical recording medium is performed. Here, in the optical recording apparatus, a portion of the laser emitted from the laser source is led to the laser detector, which controls the light intensity of the laser emitted from the laser source based on the detected amount of the laser. The laser detector transforms the detected amount of the laser to a voltage or a current and outputs as a detection signal.

Examples of the other units include a controlling unit. The controlling unit is not restricted as long as the controlling unit controls each of the above-noted units and may be properly selected depending on the application. Examples of the controlling unit include a sequencer and a computer.

With the optical recording and reproducing apparatus of the present invention, it is possible to perform a stable recording with high reflectivity and high modulation on the optical recording medium of the present invention to which the amount of the crosstalk between recording marks is reduced and favorable recording signal properties may be obtained.

The present invention provides the following: a high-performance optical recording medium and a recording and reproducing method thereof, wherein favorable recording signal properties may be obtained even from a second recording layer which is located more distant in the double-layer optical recording medium that comprises a first recording layer and a second recording layer, and the amount of crosstalk between recording marks may be reduced as well; and an optical recording and reproducing apparatus.

Hereinafter, the present invention will be illustrated in more detail with reference to examples given below, but these are not to be construed as limiting the present invention.

EXAMPLE 1

-Preparation of Optical Recording Medium-

A second substrate made of polycarbonate resin having a diameter of 120 mm and a thickness of 0.57 mm, on which a convexo-concave pattern of guide grooves having a depth of 32 nm (320 Å) and a width (at the bottom of the grooves) of 0.25 μm, wherein the pattern had a track pitch of 0.74 μm, was prepared. On the second substrate, a second reflective layer comprising AgIn (mixing ratio of Ag to In on an atomic basis is 99.5 to 0.5) having a thickness of 150 nm (1,500 Å) was formed by sputtering method with Ar as a sputtering gas.

Next, on the second reflective layer, a second recording layer having a thickness of 80 nm (800 Å) was formed by spin coating using a coating liquid prepared by dissolving a squarylium dye compound A, which is represented by the Formula (3) and having substituents shown in Table 1, in 2,2,3,3-tetrafluoropropanol.

Next, on the second recording layer, a protective layer comprising ZnS—SiC (the molar ratio of ZnS to SiC is eight to two) was formed by a sputtering method using Ar as a sputtering gas so that the protective layer had a thickness of 150 nm (1,500 Å).

A second information layer was prepared as described above.

Regarding the light absorption spectrum of the second recording layer, the maximum absorption wavelength was 607 nm, and the absorbance (Abs) at the maximum absorption wavelength was 1.19. Here, the thickness of the second recording layer was measured using a cross-sectional transmission electron microscope (TEM) image.

FIG. 7 is a chart of thermal analysis (rate of temperature increase: 10° C./min; sample quantity: 5 mg) on the squarylium dye compound A. This indicates that the pyrolysis temperature is 279.7° C. and that the pyrolysis temperature range is approximately 15.2° C. In addition, the loss in quantity during pyrolysis was 8.6%.

Formula (3)

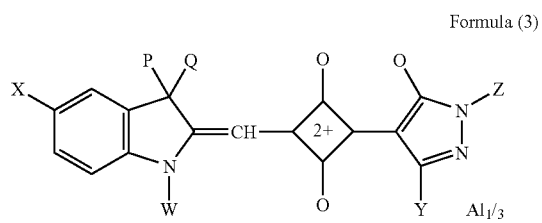

On the other hand, a first substrate made of polycarbonate resin having a diameter of 120 mm and a thickness of 0.58 mm, on which a convexo-concave pattern of guide grooves having a depth of 150 nm (1,500 Å) and a width (at the bottom of the grooves) of 0.25 μm, wherein the pattern had a track pitch of 0.74 μm, was prepared. On the first substrate, a first recording layer having a thickness of 50 nm (500 Å) was formed by spin coating using a coating liquid prepared by dissolving a mixture of the squarylium dye compound A and a formazan metal chelate compound B, represented by Formula (4), with a mixing ratio of A to B being seven to three on a mass basis, in 2,2,3,3-tetrafluoropropanol.

Next, on the first recording layer, a first reflective layer having a thickness of 12 nm (120 Å) and comprising AgIn (mixing ratio of Ag to In on an atomic basis is 99.5 to 0.5) was formed by sputtering method with Ar as a sputtering gas.

A first information layer was prepared as described above.

Formula (4)

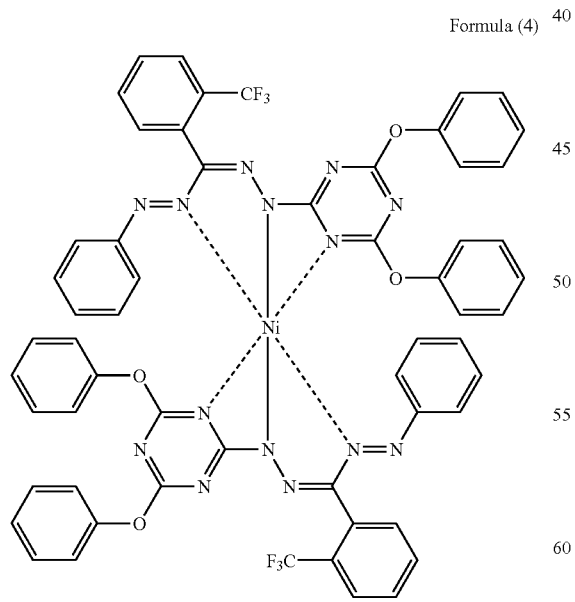

After that, the first information layer and the second information layer were laminated with a UV-cure adhesive (KARAYAD DVD 576 manufactured by Nippon Kayaku Co., Ltd.) to form an intermediate layer with a thickness of 50±5 μm. Finally, a double-layer optical recording medium with a layer configuration shown in FIG. 3 was prepared.

<Evaluation>

After a DVD (8-16) signal was recorded with a wavelength of 657 nm, a numerical aperture (NA) of 0.65 and a linear velocity of 9.2 m/sec on the second information layer of the optical recording medium prepared as above, and the reproduction in the second recording layer was evaluated. It was found that the second recording layer had a reflectivity (I14H) of 19%, a modulation (I14/I14H) of 90% and PI Sum 8 of 20 or less after recording; signal properties satisfactory to DVD-ROM standards were obtained. Here, PI Sum 8 is a parameter for data error defined by DVD standards, indicating the number of uncorrected PI errors in the consecutive 8 ECC blocks; PI Sum 8 is less than 280 according to DVD standards. Also, for the evaluation, DDU 1000, manufactured by PulseTech Products Corporation was used as a recording evaluation apparatus.

Further, the modulation I3R ((I14H-I3L)/I14H) of the shortest recording mark was calculated with the increase rates in recording one track and in recording consecutive tracks by the following Equation (1), and the amount of crosstalk was evaluated. The results are shown in Table 2 and FIG. 8. Meanwhile, when the increase rate ΔI3R is 0.10 (10%) or greater, in general, recording and reproducing errors tends to occur on a more frequent basis because the configuration errors in recording condition increase due to the difference between the optimum recording condition or optimum power control (OPC) configured for recording one track and the recording properties for recording continuous data. In addition, the jitter of less than 9% according to DVD standards will become difficult to achieve due to the effect of recording marks on the adjacent tracks.

Increment Rate: $\Delta I3R = [I3R(\text{continuous recording}) - I3R(\text{one-track recording})]/I3R(\text{continuous recording})$ <Equation (1)>

EXAMPLES 2 TO 6 AND COMPARATIVE EXAMPLES 1 TO 3

-Preparation of Optical Recording Medium-

An optical recording medium was prepared in the same manner as Example 1, except that the squarylium metal chelate compound A, as a material for the second recording layer, was changed to squarylium metal chelate compounds B to I represented by Formula (3) and comprising substituents shown in Table 1. For each of the squarylium metal chelate compounds B to I, the pyrolysis temperature and the pyrolysis temperature range were measured in the same manner as Example 1. The results are shown in Table 1.

<Evaluation>

Each of the optical recording medium was evaluated in the same manner as Example 1. It was found that the reflectivity (I14H) of 19%, the modulation (I14/I14H) of 90% and PI Sum 8 of 20 or less after recording. Hence, signal properties satisfactory to DVD-ROM standards were obtained.

Also, the amount of crosstalk was evaluated in the same manner as Example 1. The results are shown in Table 2 and FIG. 8.

EXAMPLE 7

-Preparation of Optical Recording Medium-

An optical recording medium was prepared in the same manner as Example 1, except that the thickness of the second recording layer was changed to 50 nm (500 Å) and the thickness of the protective layer, comprising ZnS—SiC, where the molar ratio of ZnS to SiC was eight to two, was changed to 180 nm (1,800 Å).

<Evaluation>

The optical recording medium was evaluated in the same manner as Example 1. It was found that the reflectivity (I14H) of 18%, the modulation (I14/I14H) of 65% and PI Sum 8 of 20 or less after recording; signal properties satisfactory to DVD-ROM standards were obtained.

Also, the amount of crosstalk was evaluated in the same manner as Example 1. The results are shown in Table 2 and FIG. 8.

EXAMPLE 8

-Preparation of Optical Recording Medium-

An optical recording medium was prepared in the same manner as Example 1, except that the thickness of the second recording layer was changed to 100 nm (1,000 Å) and the thickness of the protective layer, comprising ZnS—SiC, where the molar ratio of ZnS to SiC was eight to two, was changed to 80 nm (800 Å).

<Evaluation>

The optical recording medium was evaluated in the same manner as Example 1. It was found that the reflectivity (I14H) of 19%, the modulation (I14/I14H) of 92% and PI Sum 8 of 20 or less after recording; signal properties satisfactory to DVD-ROM standards were obtained.

Also, the amount of crosstalk was evaluated in the same manner as Example 1. The results are shown in Table 2 and FIG. 8.

EXAMPLE 9

-Preparation of Optical Recording Medium-

An optical recording medium was prepared in the same manner as Example 1, except that a first substrate made of a polycarbonate resin having a diameter of 120 mm and a thickness of 0.58 mm, on which DVD-ROM pits having a depth of 150 nm (1,500 Å), was prepared and that a reproduction-only first information layer was formed by depositing over the first substrate a reflective layer comprising AgIn (mixing ratio of Ag to In on an atomic basis is 99.5 to 0.5) and having a thickness of 12 nm (120 Å) by sputtering method with Ar as a sputtering gas.

<Evaluation>

The optical recording medium was evaluated in the same manner as Example 1. It was found that the reflectivity (I14H) of 21%, the modulation (I14/I14H) of 89% and PI Sum 8 of 20 or less after recording; signal properties satisfactory to DVD-ROM standards were obtained.

TABLE 1

| | | Squarylium Compound | | | | | | Pyrolysis Temperature (° C.) | Pyrolysis Temperature Range (C. °) |
|---|---|---|---|---|---|---|---|---|---|
| | | W | X | Y | Z | P | Q | | |
| Example 1 | A | Me | Benz | $CF_3$ | Ph | Me | Me | 279.7 | 15.2 |
| Example 2 | B | Me | Benz | $C_3H_7$ | Ph | Me | Me | 336.5 | 12.1 |
| Example 3 | C | Me | Benz | $CF_3$ | $C_4H_9$ | Me | Me | 326.3 | 10.7 |
| Example 4 | D | Me | OMe | $C_3H_7$ | Ph | Me | Me | 323.4 | 41.6 |
| Comparative Example 1 | E | Me | Cl | $C_3H_7$ | Ph | Me | Me | 329.0 | 54.5 |
| Comparative Example 2 | F | Me | Cl | $C_3H_7$ | Ph | Cyclohexyl | | 312.0 | 88.8 |
| Example 5 | G | $C_4H_9$ | Me | Ph | Ph | Me | Me | 305.2 | 43.6 |
| Comparative Example 3 | H | Me | Cl | $C_3H_7$ | $C_4H_9$ | Me | Me | 341.6 | 58.7 |
| Example 6 | I | $C_3H_7$ | Cl | $CF_3$ | Ph | Cyclohexyl | | 279.7 | 41.5 |
| Example 7 | A | Me | Benz | $CF_3$ | Ph | Me | Me | 279.7 | 15.2 |
| Example 8 | A | Me | Benz | $CF_3$ | Ph | Me | Me | 279.7 | 15.2 |

TABLE 2

| | | Maximum Absorption Wavelength (nm) | Abs. | I14R | REF (%) | Asymmetry | ΔI3R |
|---|---|---|---|---|---|---|---|
| Example 1 | A | 607 | 1.19 | 0.77 | 60 | 0.00 | 0.05 |
| Example 2 | B | 619.5 | 1.4 | 0.85 | 48 | 0.03 | 0.04 |
| Example 3 | C | 609 | 1.16 | 0.73 | 51 | 0.02 | 0.05 |
| Example 4 | D | 615 | 1.49 | 0.84 | 55 | −0.01 | 0.06 |
| Comparative Example 1 | E | 605 | 1.81 | 0.81 | 63 | 0.01 | 0.13 |
| Comparative Example 2 | F | 609.5 | 1.53 | 0.71 | 60 | 0.02 | 0.11 |
| Example 5 | G | 610.5 | 1.47 | 0.80 | 56 | 0.03 | 0.07 |
| Comparative Example 3 | H | 594 | 1.63 | 0.75 | 65 | 0.01 | 0.20 |
| Example 6 | I | 603.5 | 1.26 | 0.54 | 61 | 0.04 | 0.08 |
| Example 7 | A | 607 | 1.19 | 0.77 | 60 | 0.00 | 0.05 |
| Example 8 | A | 607 | 1.19 | 0.77 | 60 | 0.00 | 0.05 |

Here, in Table 1, Me denotes a methyl group, Ph a phenyl group, Benz a benzene ring fused as shown in Formula (5):

Formula (5)

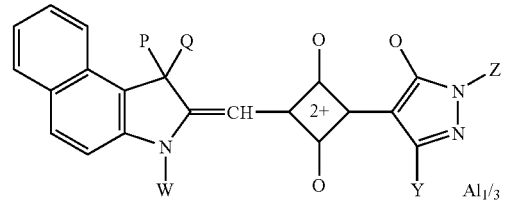

Also in Table 2, I14R denotes I14/I14H; REF (%) I14H; and Asymmetry a signal asymmetry, ((I14H+I14L)/2−(I3H+I3L)/2)/I14.

Figure 8:
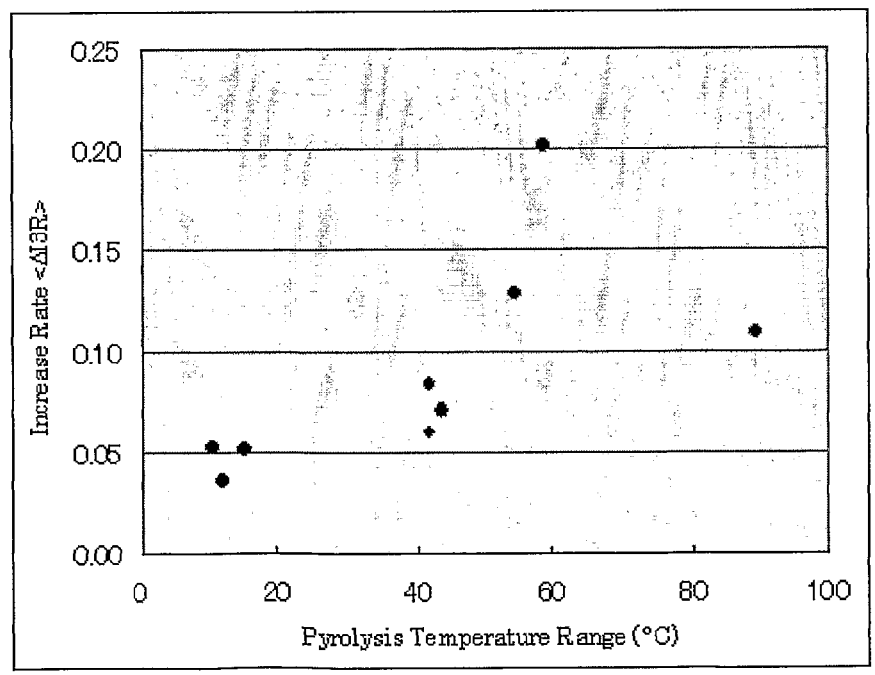
FIG. 8 is a graph that shows the relation between the pyrolysis temperature range and the increase rate of I3R, modulation of the shortest recording mark.

Based on the results in Tables 1 to 2 and FIG. 8, Examples 1 to 8, having pyrolysis temperature ranges of organic dyes in the second recording layers of 45° C. or less, show that the amount of crosstalk between recording marks were suppressed and that favorable recording signal properties were achieved. Also, FIG. 8 shows that the smaller amounts of crosstalk were achieved with narrower pyrolysis temperature ranges.

On the contrary, Comparative Examples 1 to 3 had the pyrolysis temperature ranges exceeding 45° C. (greater than about 55° C.); they indicate that the modulation of the shortest recording mark changes by 10% or greater.

INDUSTRIAL APPLICABILITY

An optical recording medium of the present invention, comprising a first recording layer and a second recording layer, wherein favorable recording signal properties may be obtained even from the second recording layer which is located more distant from the substrate to which the laser is applied than the first recording layer, may be favorably applied to write once read many DVD systems such as DVD+Rs and DVD-Rs since the amount of crosstalk is suppressed and favorable recording signal properties may be provided.

The invention claimed is:

1. An optical recording medium comprising:
a first substrate,
a first information layer,
an intermediate layer and
a second substrate in this order,
wherein the first information layer comprises a first recording layer,
the second information layer comprises a second reflective layer, a second recording layer comprising an organic dye and a protective layer, and
the pyrolysis temperature range, which corresponds to the DTA peak width based on the thermal analysis of the organic dye in the second recording layer, is 45° C. or less.

2. The optical recording medium according to claim 1, wherein, by applying a light to the surface of the first substrate of the optical recording medium, at least any one of recording and reproducing of the information is performed on the first recording layer and the second recording layer.

3. The optical recording medium according to claim 1, wherein the pyrolysis temperature range in the second recording layer is 20° C. or less.

4. The optical recording medium according to claim 1, wherein the pyrolysis temperature, the DTA peak value based on the thermal analysis of the organic dye in the second recording layer, is 200° C. to 350° C.

5. The optical recording medium according to claim 1, wherein at least any one of the maximum absorption wavelength and the absorption peak wavelength of the organic dye in the second recording layer is in the range of 580 nm and 620 nm.

6. The optical recording medium according to claim 1, wherein the organic dye in the second recording layer comprises a compound selected from squarylium metal chelate compounds.

7. The optical recording medium according to claim 1, wherein the thickness of the second recording layer is 50 nm to 100 nm.

8. The optical recording medium according to claim 1, wherein the first information layer comprising the first recording layer is only for reproduction, and the first recording layer comprises a reflective film.

9. The optical recording medium according to claim 1, wherein the first information layer comprises the first recording layer with an organic dye and a first reflective layer.

10. The optical recording medium according to claim 1, wherein the protective layer comprises ZnS.

11. The optical recording medium according to claim 1, wherein the protective layer has a thickness of 80 nm to 180 nm.

12. The optical recording medium according to claim 1, wherein the second reflective layer comprises Au, Al, Ag or an alloy based on these metals.

13. The optical recording medium according to claim 1, wherein the thickness of the intermediate layer is 40 µm to 70 µm.

14. The optical recording medium according to claim 1, wherein the second substrate comprises guide grooves, and the depth of the guide grooves is 20 nm to 60 nm.

15. A recording and reproducing method of the optical recording medium, wherein at least any one of recording and reproducing of the information is performed on the first recording layer and the second recording layer by applying a light with a wavelength of 580 nm to 720 nm to the surface of the first substrate of the optical recording medium;
wherein the optical recording medium comprises:
a first substrate,
a first information layer,
an intermediate layer and
a second substrate in this order,
wherein the first information layer comprises a first recording layer,
the second information layer comprises a second reflective layer, a second recording layer comprising an organic dye and a protective layer, and
the pyrolysis temperature range, which corresponds to the DTA peak width based on the thermal analysis of the organic dye in the second recording layer, is 45° C. or less.

16. A recording and reproducing apparatus comprises
a light source and
the optical recording medium,
wherein at least any one of recording and reproducing of the information is performed on the first recording layer and the second recording layer is performed by applying a light with a wavelength of 580 nm to 720 nm to the surface of the first substrate of the optical recording medium, and the optical recording medium comprising:
a first substrate,
a first information layer,
an intermediate layer and
a second substrate in this order,
wherein the first information layer comprises a first recording layer,
the second information layer comprises a second reflective layer, a second recording layer comprising an organic dye and a protective layer, and
the pyrolysis temperature range, which corresponds to the DTA peak width based on the thermal analysis of the organic dye in the second recording layer, is 45° C. or less.

* * * * *